F. C. GIESEKER.
CARRIER.
APPLICATION FILED APR. 8, 1916.
1,197,284.  Patented Sept. 5, 1916.
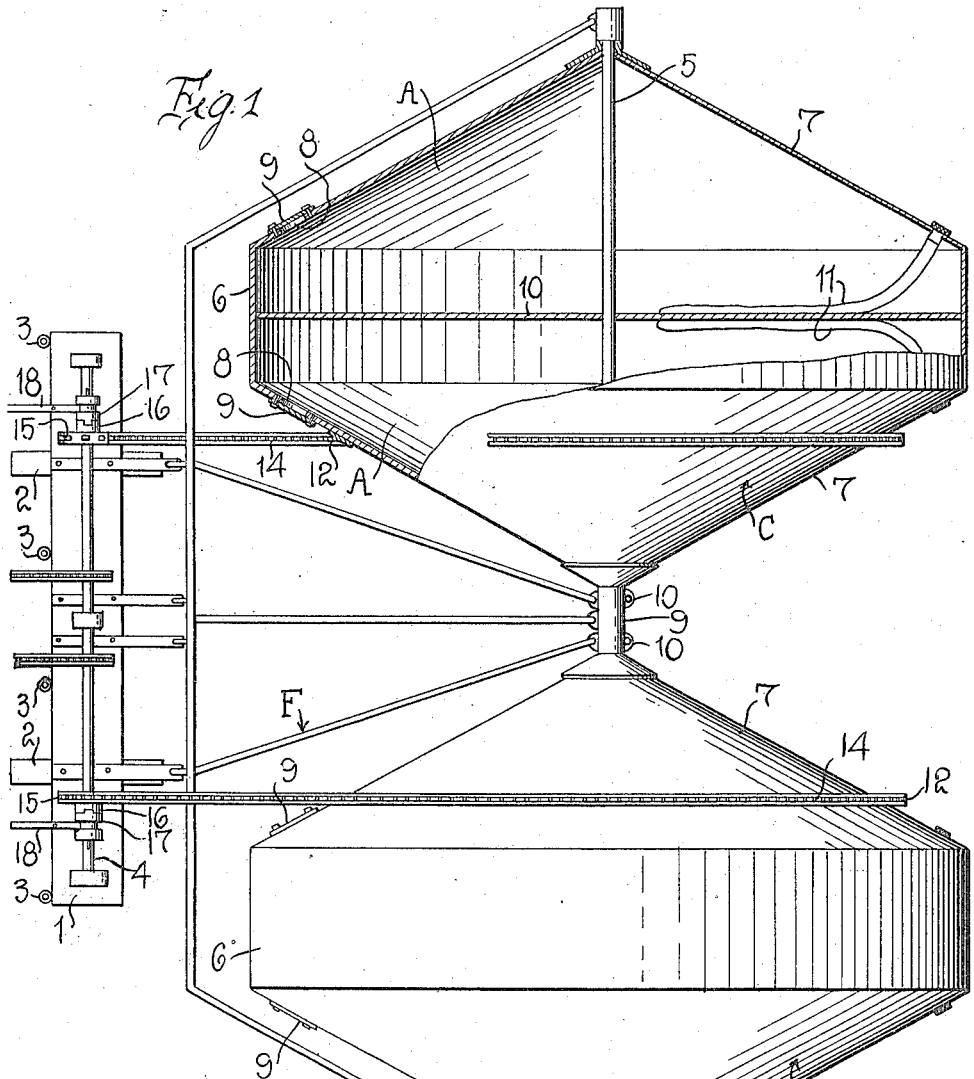
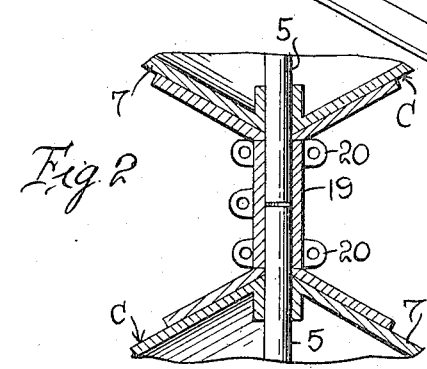
Inventor
F. C. GIESEKER
By Watson E. Coleman
Attorney though it is to be understood.

UNITED STATES PATENT OFFICE.

FREDERICK C. GIESEKER, OF ELMWOOD, WISCONSIN.

CARRIER.

1,197,284.  Specification of Letters Patent.  Patented Sept. 5, 1916.

Application filed April 8, 1916. Serial No. 89,883.

*To all whom it may concern:*

Be it known that I, FREDERICK C. GIESE-KER, a citizen of the United States, residing at Elmwood, in the county of Pierce and State of Wisconsin, have invented certain new and useful Improvements in Carriers, of which the following is a specification, reference being had to the accompanying drawings.

This invention relates to certain improvements in carriers and it is an object of the invention to provide a novel and improved device of this general character adapted to contain a load and which is also adapted, when in transit, to roll upon the surface traversed.

It is also an object of the invention to provide a carrier of this general character especially designed and adapted for use in the transportation of grain or the like and including novel and improved means whereby the load within the carrier may be held against shifting.

Furthermore it is an object of the invention to provide a novel and improved carrier adapted to roll upon the surface traversed and whereby the same is positively rotated.

The invention consists in the details of construction and in the combination and arrangement of the several parts of my improved carrier whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view partly in top plan and partly in section illustrating an embodiment of my invention; and Fig. 2 is an enlarged fragmentary view partly in section and partly in plan illustrating certain details of the device as herein included.

As disclosed in the accompanying drawings, 1 denotes a beam herein disclosed as provided with the supporting wheels 2 and having one longitudinal marginal portion provided with a means 3 whereby the same may be hitched or otherwise connected to a traction engine or the like. I wish it to be understood, however, that I do not desire to limit myself as to any particular source of power. Mounted upon the beam 1 and disposed longitudinally thereof is the shaft 4 adapted to be coupled with a movable part of the tractor or other suitable source of power.

Operatively engaged with the beam 1 is the frame F of predetermined dimensions and which supports the shafts 5 with which are operatively engaged the carriers C adapted to contain grain or other load. Each of the carriers C is provided with a broad tread surface 6 and has its opposite sides convex, as indicated at 7, and the sides 7 are provided with the openings 8 to permit the loading or unloading of the carrier, said openings having coacting therewith a conventional closure member 9. It is also preferred that each of the carriers C be divided into two compartments A through the medium of the partition 10 arranged at substantially the transverse center of the tread portion 6.

As herein embodied, my improved device is particularly adapted for use in connection with the transportation of grain, and in the event that the load does not entirely fill each of the compartments A, I have found it of especial advantage to have extending within each of the compartments A through a side thereof, the expansible bag 11 adapted to be inflated with air whereby it will be perceived that possibility of the shifting of a load within the compartment is substantially eliminated.

The opposed sides 7 of the carriers C are provided with the annular sprocket members 12 around each of which passes the chain 14 which is also directed around a sprocket 15 operatively engaged with the shaft 4 hereinbefore referred to. It is preferred that the sprocket 15 be loosely mounted upon the shaft 4 and provided with a clutch face 16 with which coacts the clutch member 17 keyed to the shaft 4 but capable of sliding movement longitudinally thereof, whereby the sprocket 15 may be rendered inoperative when desired, and especially when a turn is to be made. Any conventional means as indicated at 18 may be employed for imparting requisite sliding or shifting movement to the clutch member 17.

As is particularly illustrated in Fig. 2, it is to be observed that the inner ends of the shafts 5 are rotatably supported within the interposed bushing 19 whereby the shafts 5 are capable of independent relative rotation in order to facilitate the making of a turn. It is also to be observed that the bushing 19 is provided with the ears 20 whereby a second set of carriers may be coupled if the requirements of practice should so require.

From the foregoing description, it is thought to be obvious that a carrier constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. In combination, a wheel-supported beam, a driven shaft carried thereby, a frame operatively engaged with the beam, a plurality of hollow members rotatably supported by the frame and capable of rotation one independently of the other, and an operative connection between each of the hollow members and the driven shaft.

2. In combination, a wheel-supported beam, a driven shaft carried thereby, a frame operatively engaged with the beam, a plurality of hollow members rotatably supported by the frame and capable of rotation one independently of the other, an operative connection between each of the hollow members and the driven shaft, and means coacting with each of said operative connections for rendering the same inoperative.

3. In combination, a wheel-supported beam, a driven shaft carried thereby, a frame operatively engaged with the beam, a plurality of hollow members rotatably supported by the frame and capable of rotation one independently of the other, and an operative connection between each of the hollow members and the driven shaft, said beam being provided with hitching means.

In testimony whereof I hereunto affix my signature in the presence of two witnesses.

FREDERICK C. GIESEKER.

Witnesses:
F. A. SPRINGER,
FLOYD J. THOMPSON.

Copies of this patent may be obtained for five cents each, by addressing the "Commissioner of Patents, Washington, D. C."